United States Patent
Yamamoto et al.

(10) Patent No.: US 9,070,485 B2
(45) Date of Patent: Jun. 30, 2015

(54) REACTOR VESSEL REPAIR METHOD

(75) Inventors: Takeshi Yamamoto, Tokyo (JP);
Kazuhide Yamamoto, Tokyo (JP);
Masaya Yamaguchi, Tokyo (JP); Koji Shukutani, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 563 days.

(21) Appl. No.: 13/319,773

(22) PCT Filed: Dec. 6, 2010

(86) PCT No.: PCT/JP2010/071787
§ 371 (c)(1),
(2), (4) Date: Jan. 23, 2012

(87) PCT Pub. No.: WO2011/070997
PCT Pub. Date: Jun. 16, 2011

(65) Prior Publication Data
US 2012/0117774 A1  May 17, 2012

(30) Foreign Application Priority Data
Dec. 8, 2009 (JP) .................................. 2009-278516

(51) Int. Cl.
*G21C 17/017* (2006.01)
*G21C 19/20* (2006.01)
(Continued)

(52) U.S. Cl.
CPC .......... *G21C 19/207* (2013.01); *Y10T 29/49718* (2015.01); *B23P 6/00* (2013.01); *G21C 17/01* (2013.01); *G21C 17/017* (2013.01); *G21C 19/14* (2013.01)

(58) Field of Classification Search
CPC .......... B23P 6/00; B23P 6/04; G21C 19/207; G21C 19/01; G21C 17/01; G21C 17/017
USPC ................ 29/402.01, 402.03, 402.08, 402.09
See application file for complete search history.

(56) References Cited

U.S. PATENT DOCUMENTS 3,756,915 A    9/1973   Matveevich et al.

FOREIGN PATENT DOCUMENTS

EP    0052570 A1   5/1982
JP    1-097898 A   4/1989
(Continued)

OTHER PUBLICATIONS

International Search Report of PCT/JP2010/071787, mailing date Mar. 8, 2011.
(Continued)

*Primary Examiner* — Christopher Besler
(74) *Attorney, Agent, or Firm* — Westerman, Hattori, Daniels & Adrian, LLP

(57) ABSTRACT

In a reactor vessel (20) covered by cooling water (2), a tubular frame (10) with a bottom is hung within the cooling water (2) while still having an air environment in the interior, and the bottom section of the frame (10) is disposed within the reactor vessel (20), thereby achieving an air environment within the reactor vessel (20). Furthermore, since repairs to the reactor vessel (20) are performed by using the frame (10) while still having the air environment in the interior, this leads to the prevention of contamination and achieves improvements in working conditions such as preventing the generation of dust and reducing decontamination work. Accordingly, repairs can be performed in an air environment without draining the cooling water (2) within the reactor vessel (20), even in a state in which the reactor vessel (20) is covered by the cooling water (2).

5 Claims, 12 Drawing Sheets

(51) Int. Cl.
*B23P 6/00* (2006.01)
*G21C 17/01* (2006.01)
*G21C 19/14* (2006.01)

(56) References Cited

FOREIGN PATENT DOCUMENTS

| JP | 8-189992 A | 7/1996 |
|---|---|---|
| JP | 2006-349596 A | 12/2006 |
| JP | 2007-003442 A | 1/2007 |
| JP | 2007-155726 A | 6/2007 |
| WO | 2008/082235 A1 | 7/2008 |

OTHER PUBLICATIONS

Written Opinion of PCT/JP2010/071787, mailing date Mar. 8, 2011.
Japanese Office Action dated Sep. 24, 2014, issued in corresponding Japanese Application No. 2009-278516; w/ English Translation. (5 pages).
Extended European Search Report dated Feb. 17, 2015, issued in European Application No. 10835917.5. (5 pages).

REACTOR VESSEL REPAIR METHOD

FIELD OF THE INVENTION

The present invention relates to a method for repairing a rector vessel. In particularly, the present invention relates to a repair method of a Pressurized Water Reactor (PWR) and so on, for example, a method for repairing an inner surface of the tubular frame.

BACKGROUND OF THE INVENTION

In a conventional method, a repairing operation at an interior of a tubular frame in a reactor vessel has to be operated in a underwater condition since the interior of the reactor vessel is filled with cooling water in an ordinary state.

However, in the case that a repairing operation is done in such an underwater condition, the all devices have to have a water-proof performance. The all devices become large and heavy. As the result, the all devices are treated with some difficulty.

The devices utilized in the underwater condition have to be decontaminated after lighting from the cooling water since those devices are exposed with radiation in the cooling water.

Recently, it is recommended a method for inspecting in an interior of tubular frame in the reactor vessel in an air environment (Patent Document 1).

In the recommended method, a water surface level of a cooling water at an interior of a reactor vessel is lowered with respect to a location of a tubular frame, a frame is set at an interior of the reactor vessel. At the interior of the frame, an operator inserts an Ultrasonic Testing (hereinafter, it is referred as "UT") device for testing with ultrasonic wave into the tubular frame and sets it in the tubular frame so as to operate UT inspection.

PRIOR ART

Patent Document

Patent Document 1: Japanese Patent Unexamined Publication No. 2007-3442

SUMMARY OF THE INVENTION

Subject to be Solved by the Invention

However, in the method disclosed in the Patent Document 1, the water surface level has to be lowered before setting the frame in the reactor vessel. Therefore, the cooling water in the reactor vessel has to be discharged in order that the water surface level is lower than the tubular frame.

That is, at the paragraph of [0005] in the Patent Document 1, there is a description of "In a reactor vessel tubular frame welded portion UT inspection method for UT inspecting a welded portion between an inlet tube/an outlet tube connected to the tubular frame and the tubular frame provided at a side surface of the reactor vessel, a characterized feature of the method is as follows: at least the cooling water has to be discharged in the reactor vessel until a water surface level of the cooling water is lower than a location of the tubular frame. A frame having an opening portion provided at a side surface of the frame is set in the reactor vessel wherein the position of the opening portion is corresponding to a position of the tubular frame. In the next, a disc shaped shield member is inserted into the tubular frame through the opening portion and then the disc shaped shield member is set therein. The UT inspection device is inserted into the tubular frame so as to UT inspect the welded portion.".

Thus, the present invention is accomplished so as to resolve the above drawbacks. A purpose of the present invention is to provide a method for repairing a reactor vessel wherein cooling water in the reactor vessel can be discharged and a repairing operation is done in an air environment without discharging cooling water in a cavity.

Means to Solve the Subject

To resolve the above subject, a method for repairing a reactor vessel covered with cooling water according to claim 1 of the present invention is characterized of comprising a step of hanging down a tubular frame of which an interior is in an air environment having a bottom board into the cooling water, a step of setting an lower portion of the tubular frame in the reactor vessel while the interior of the tubular frame having the bottom board is in the air environment and a step of repairing the reactor vessel.

To resolve the above subject, a method for repairing a reactor vessel according to claim 2 of the present invention is characterized in that a counter weight for canceling out buoyancy occurred in a step for handing down the tubular frame into the cooling water is provided at the frame in the method as claimed in the claim 1.

To resolve the above subject, a method for repairing a reactor vessel according to claim 3 of the present invention is characterized in that the frame is formed by a platform set at an interior of the reactor vessel and cylindrical containers connected and laminated on the platform in the method as claimed in the claim 1 or the claim 2.

To resolve the above subject, a method for repairing a reactor vessel according to the claim 4 of the present invention is characterized in that the platform is formed by a substantially cylindrical shaped sidewall of which an outer diameter is smaller than an inner diameter of the reactor vessel and the bottom board for closing a lower end of the sidewall, wherein an access window for connecting a tubular frame provided at a side wall of the reactor vessel is formed at the sidewall and the access window can be sealed by attaching a cover body in the method as claimed in the claim 3.

To resolve the above subject, a method for repairing a reactor vessel according to claim 5 of the present invention is characterized in that the platform comprises a flange portion protruded from an upper end of the sidewall toward an outer peripheral direction and supported by an upper end of the reactor vessel and a sealing element is inserted to a gap between the upper end of the reactor vessel and the flange portion in the method as claimed in the claim 4.

To resolve the above subject, a method for repairing a reactor vessel according to claim 6 of the present invention is characterized in that an underwater fastening portion for tightly fastening the flange portion with respect to the upper end of the reactor vessel is provided in the method as claimed in the claim 5.

To resolve the above subject, a method for repairing a reactor vessel according to claim 7 of the present invention is characterized in that a tubular frame shielding means for shielding a gap between the access window and the tubular frame is provided in the method as claimed in the claim 4.

To resolve the above subject, a method for repairing a reactor vessel according to claim 8 of the present invention is characterized in that a shield effective seal plug for shielding the tubular frame is provided in the method as claimed in the claim 4.

To resolve the above subject, a method for repairing a reactor vessel according to claim 9 of the present invention is as characterized in that an earthquake-resistant support member is attached at the uppermost portion of the cylindrical containers and the earthquake-resistant support member is connected to a structure existing at a peripheral area with connecting tools in the method as claimed in the claim 3.

To resolve the above subject, a method for repairing a reactor vessel according to claim 10 of the present invention is characterized in that a pump for discharging the cooling water in the reactor vessel to the exterior of the reactor vessel and a pipe connected to the pump are provided at the platform in the method as claimed in the claim 3.

Effect of the Invention

In the method for repairing a reactor vessel covered with cooling water according to claim 1 of the present invention, a tubular frame of which an interior is in an air environment having a bottom board is hung down into the cooling water and an lower portion of the tubular frame in the reactor vessel is set while the interior of the tubular frame having the bottom board is in the air environment in order to repair the reactor vessel. Thereby, contaminating factors can be prevented from being occurred and operation efficiency can be improved. For example, a generation of dust can be prevented and a decontaminating operation can be shortened.

In the method for repairing a reactor vessel according to claim 2 of the present invention, a counter weight. for canceling out buoyancy occurred in a step for hanging down the tubular frame into the cooling water is provided at the frame so that baneful influence caused by buoyancy in a step for hanging down the tubular frame into the cooling water can be resolved.

In the method for repairing a reactor vessel according to claim 3 of the present invention, the frame is formed by a platform set at an interior of the reactor vessel and cylindrical containers connected and laminated on the platform. Thereby, the frame can be divided into the platform and the cylindrical containers. Thus, these are easily conveyed in a Containment Vessel (CV). Further, in the case that the platform can be divided into a plurality of parts and the cylindrical containers can be divided into a plurality of parts, these parts can be conveyed more easily.

In the method for repairing a reactor vessel according to the claim 4 of the present invention, the platform is formed by a substantially cylindrical shaped sidewall of which an outer diameter is smaller than an inner diameter of the reactor vessel and the bottom board for closing a lower end of the sidewall, wherein an access window for connecting a tubular frame provided at a side wall of the reactor vessel is formed at the sidewall and the access window can be sealed by attaching a cover body. Thereby, while the frame is dipped into cooling water, an interior of the frame is kept in an air environment by sealing the access window with the cover body. In the case that the access window is connected to the tubular frame, an inner surface of the tubular frame is also in an air environment by introducing air through the access window.

In the method for repairing a reactor vessel according to claim 5 of the present. invention, the platform comprises a flange portion protruded from an upper end of the sidewall toward an outer peripheral direction and supported by an upper end of the reactor vessel and a sealing element is inserted to a gap between the upper end of the reactor vessel and the flange portion. Thereby, a water tightness condition can be maintained so that water can be prevented from being leaked.

In the method for repairing a reactor vessel according to claim 6 of the present invention, is characterized in that portion with respect to the upper end of the reactor vessel is provided. Even if earthquake is happened, vibration caused by the earthquake can be controlled or absorbed. Thus, the cylindrical containers can be prevented from being floated and water can be prevented from being leaked from the cavity while earthquake is happened.

In the method for repairing a reactor vessel according to claim 7 of the present invention, a tubular frame shielding means for shielding a gap between the access window and the tubular frame is provided. Foreign matters can be prevented from being dropped into a reactor core.

In method for repairing a reactor vessel according to claim 8 of the present invention, a shield effective seal plug for shielding the tubular frame is provided. Foreign matters can be prevented from being fed into a deep portion of the tubular frame.

In the method for repairing a reactor vessel according to claim 9 of the present invention, an earthquake-resistant support member is attached at the uppermost portion of the cylindrical containers and the earthquake-resistant support member is connected to a structure existing at a peripheral area with connecting tools. Even if an earthquake is happened, vibration caused by the earthquake can be controlled and/or absorbed.

In the method for repairing a reactor vessel according to claim 10 of the present invention, a pump for discharging the cooling water in the reactor vessel to the exterior of the reactor vessel and a pipe connected to the pump are provided at the platform. Thereby, the cooling water in the reactor vessel can be discharged and then a water surface level of the cooling water can be lowered with respect to the tubular frame.

EMBODIMENT TO PRACTICE THE INVENTION

The embodiments of the present invention will be described as described below.

Embodiment 1

With reference to FIG. 1 through FIG. 14, one embodiment of a method for repairing a reactor vessel according to the present invention is described.

Figure 2:
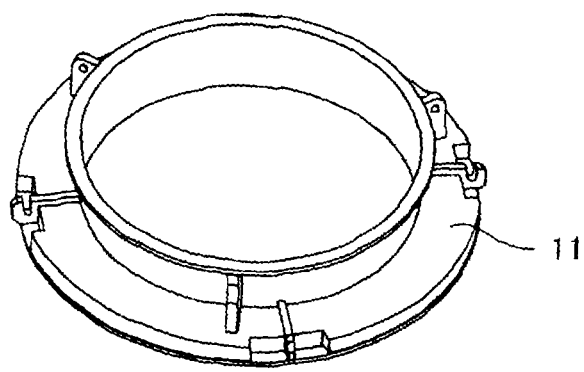
FIG. 2 shows a perspective view of an earthquake-resistant support member.
Figure 3:
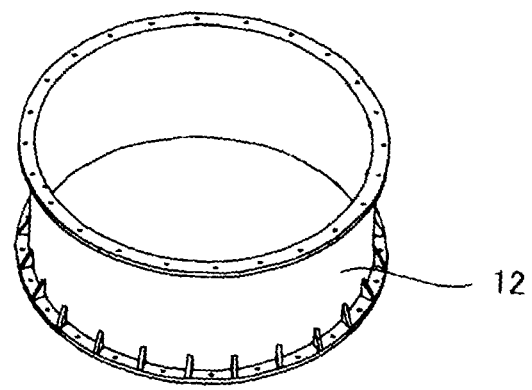
FIG. 3 shows a perspective view of a tubular container.
Figure 4:
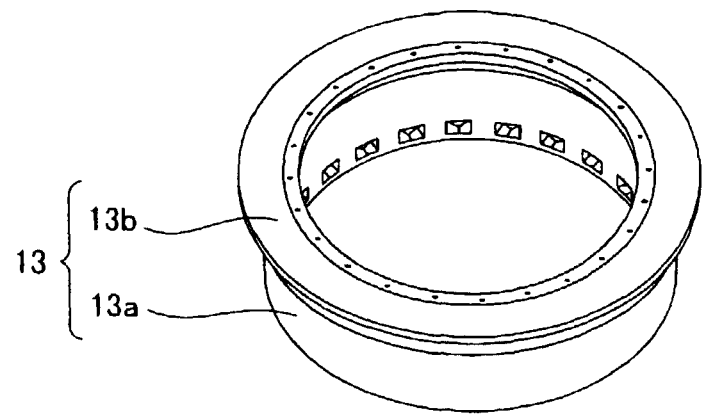
FIG. 4 shows a perspective view of an upper platform.
Figure 5:
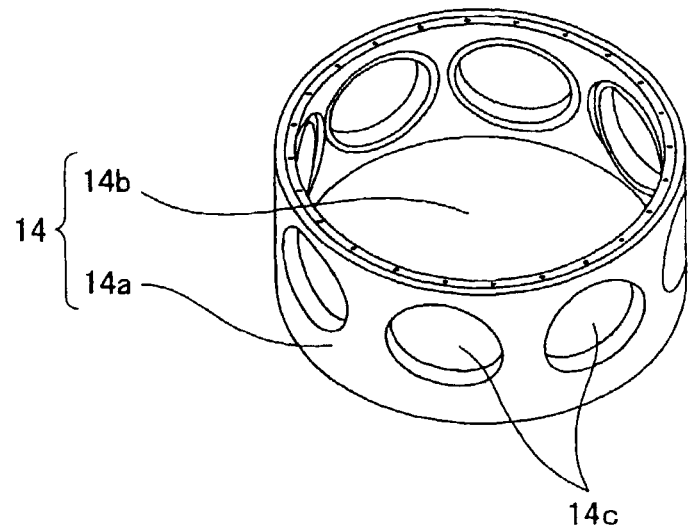
FIG. 5 shows a perspective view of a lower platform.

The embodiment of the method for repairing a reactor vessel utilizes a frame 10 having a tubular shape and a bottom surface. The frame 10 is formed by an earthquake-resistant support member 11 as shown in FIG. 2, cylindrical containers 12, an upper platform 13 as shown in FIG. 4 and a lower platform 14 as shown in FIG. 5.

Figure 6:
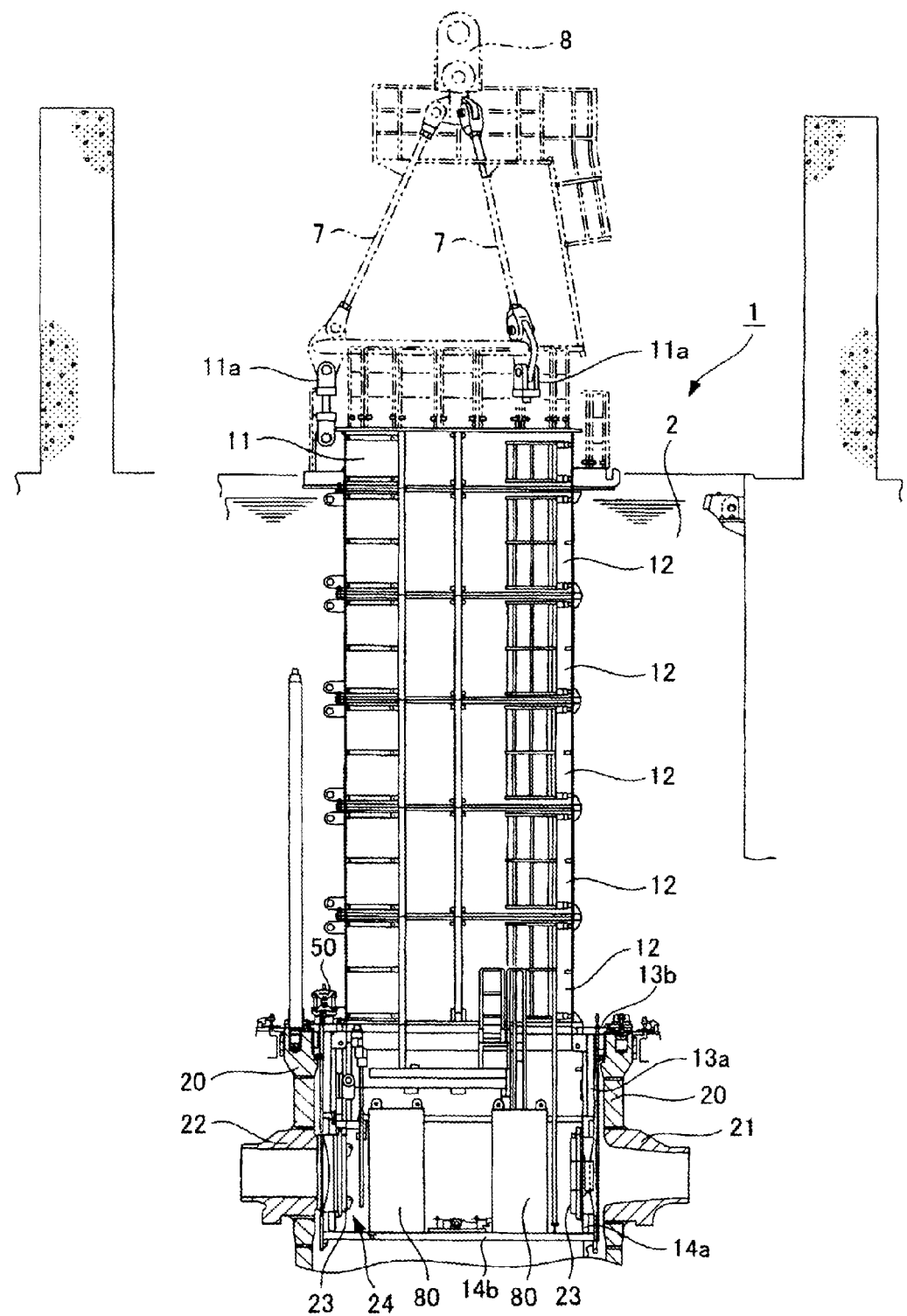
FIG. 6 shows a side view of the frame suspended and held in cooling water.

As shown in FIG. 6, the upper platform 13 and the lower platform 14 are provided as an interior of the reactor vessel 20 and the both platforms are connected each other. A series of cylindrical containers 12 in a row are connected to the upper platform.

Figure 1:
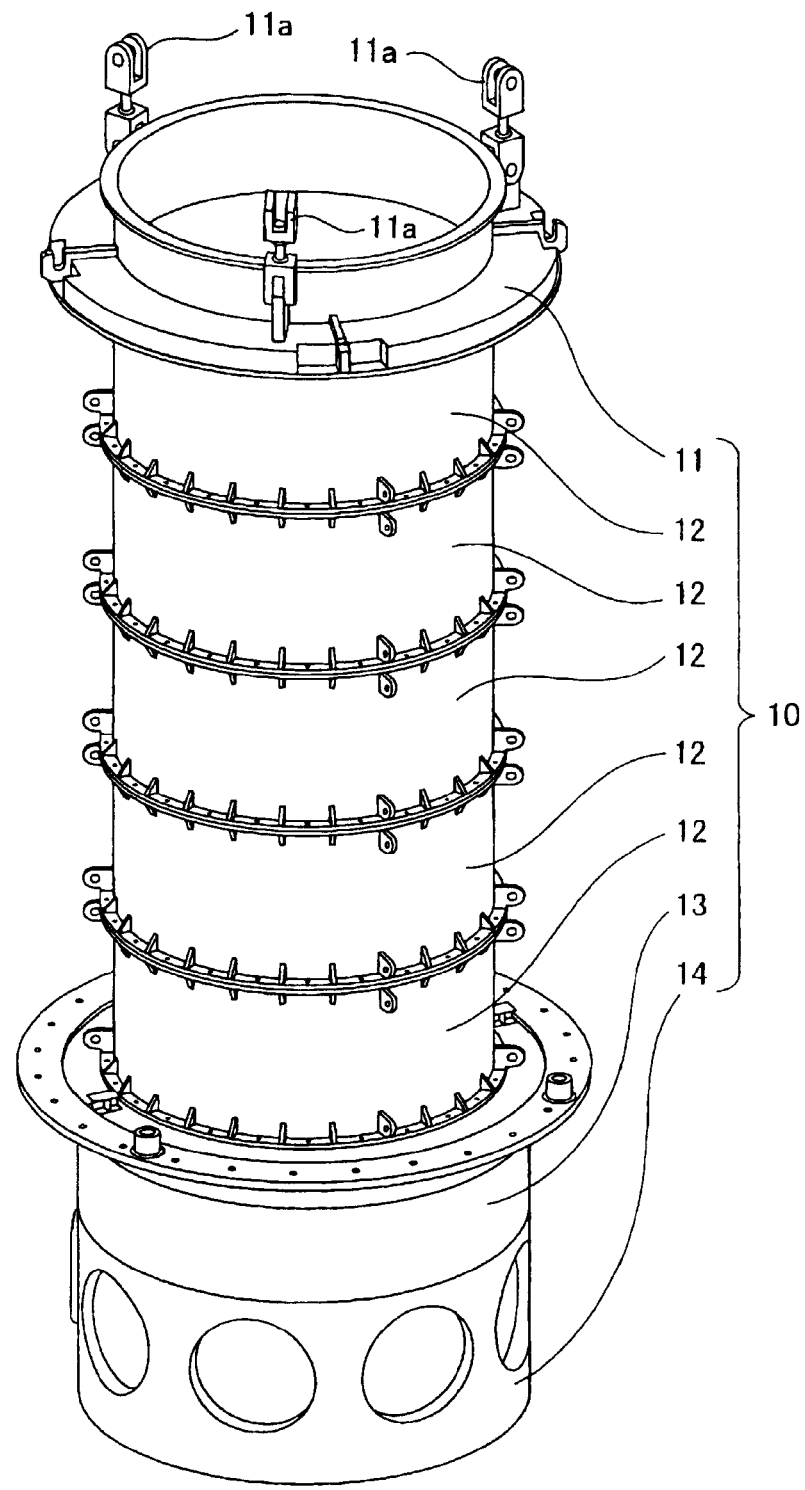
FIG. 1 shows a perspective view of a frame utilized in a method for repairing a reactor vessel.
Figure 7:
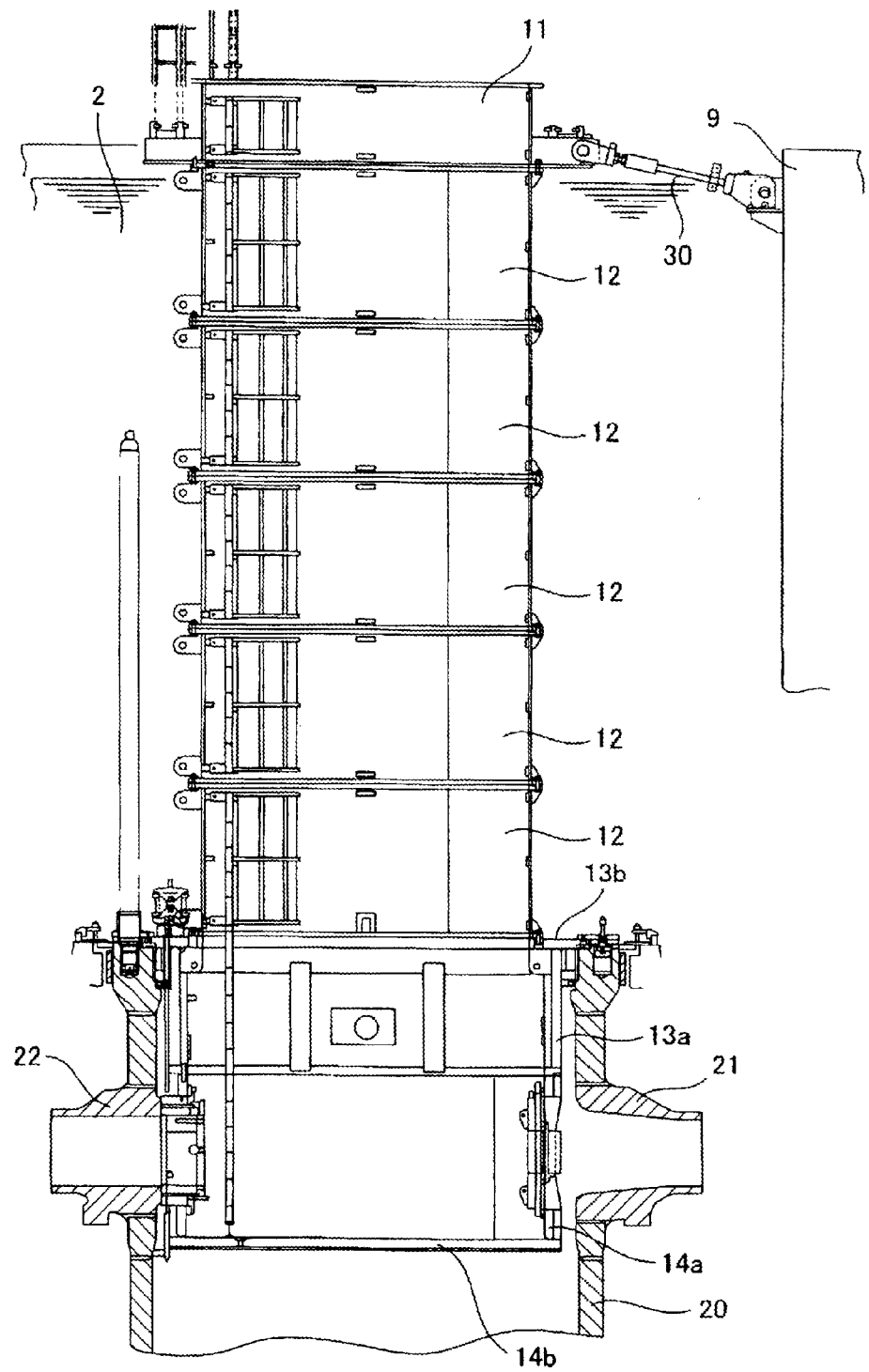
FIG. 7 shows a side view of the frame mounted at a reactor vessel.

A diameter of the fifth cylindrical container 12 in the row is slightly smaller than a diameter of the platforms 13, 14. The fifth cylindrical container 12 in the row is standing straightly towards an upper direction of the reactor vessel 20. In the embodiment as shown in FIG. 1 and FIG. 7, a number of connected cylindrical containers 12 in row is five. However, a number of the cylindrical containers in the row may be larger than one.

The earthquake-resistant support member 11 is attached to the uppermost cylindrical containers 12 in the row. As the earthquake-resistant support member 11, a plurality of suspended hooks 11a are arranged along a circumferential direction with the same interval.

Accordingly, as shown in FIG. 6, rods 7 are connected to three suspended hooks 11a, respectively. By lifting up these rods 11 by a crane machine 8, the frame 10 formed by the tubular shaped cylindrical containers 12 and the platforms 13, 14 can be lifted up integrally.

In FIG. 6, an upper structural body such as an upper wall and an inner structural body such as a reactor core are removed from an inner portion of a nuclear reactor 1 so that the reactor vessel 20 of which an upper portion is opened can be seen. The structural body in the nuclear reactor is temporarily provided in a cavity. FIG. 6 shows a condition where water is completely filled in the cavity and the reactor vessel 20 is covered with cooling water 2.

Thus, as shown in FIG. 6, the frame 10 with the rods 7 are hung into the cooling water by the crane machine 8 so that the platforms 13, 14 as the lower portion of the frame 10 can be set in the reactor vessel 20. That is, an air environment can be provided while full amount of the cooling water is in the reactor vessel 20.

The cylindrical container 12 at the uppermost in the row is located above a water surface level of the cooling water 2. A stream of the cooling water 2 is not flown into an interior of the frame 10 because the stream of the cooling water 2 cannot run over the uppermost cylindrical container 12 in the row. Thereby, the air environment interior of the frame 10 can be maintained.

As shown in FIG. 6, a counter weigh 80 for canceling out buoyancy caused by the frame 10 which is occurred while the frame 10 is hung down in an air space is provided at the lower platform 14. Therefore, any baneful influence caused by the buoyancy caused by the frame in an air space is not occurred while the frame 10 is hung into the cooling water.

At a side surface of the reactor vessel 20, at least. one pair of an inlet tubular frame 21 and an outlet tubular frame 22 are provided so that the cooling water 2 can be introduced into an interior of the reactor vessel 20 through the inlet tubular frame 21 and the cooling water 2 can be discharged to the exterior of the reactor vessel 20 through the outlet tubular frame 22.

The upper platform 13 is formed by a substantially tubular shaped side wall 13a of which an outer diameter is smaller than an inner diameter of the reactor vessel 20 and a flange portion 13b protruded from an upper end of the side wall 13a and supported by abutting on an upper end 20a of the reactor vessel 20 (hereinafter, it is referred as "flange sheet surface 20a").

Figure 9:
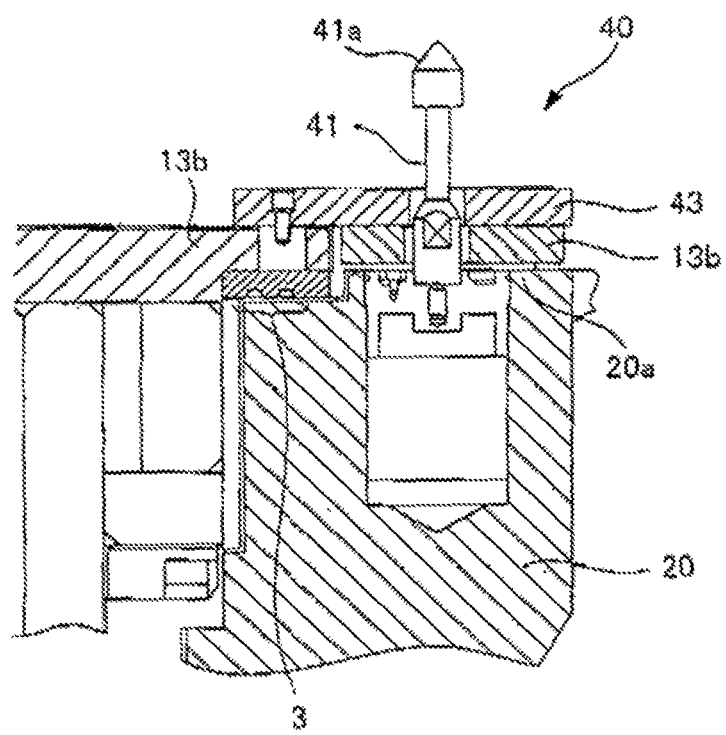
FIG. 9 shows a detailed view of an underwater joint portion for fastening the reactor vessel and the platform.

Double O-rings 3 are fitted on a portion between the flange sheet surface 20a of the reactor vessel 20 and the flange portion 13b. Further, as shown in FIG. 9, a plurality of underwater fastening portions for fastening the flange portion 13b with respect to the flange sheet surface 20a are arranged on a plurality of screw holes for fastening an upper cover member along a circumferential direction with an equivalent interval, respectively. The underwater fastening portions are described hereinafter.

The lower platform 14 is formed by a substantially cylindrical shaped sidewall 14a of which an outer diameter is smaller than an inner diameter of the reactor vessel 20 and a bottom board 14b for closing a lower end of the sidewall 14a. On the sidewall 14a, a circular access window 14c for connecting with the inlet tubular frame 21 and/or the outlet tubular frame 22.

Although the circular access window 14c is not shown in FIG. 1 and FIG. 5, as shown in FIG. 6, the access window opening/closing device 24 fits a substantially board shaped cover member 23 on an inner side of the circular access window 14c so as to seal the circular access window 14c in the case that the frame 10 is hung into the cooling water.

A thickness of the sidewall 13a (14a) of the platform 13 (14) is several times thicker than a thickness of the cylindrical container. A thickness of the bottom board 14b of the lower platform 14 is several times thicker than the thickness of the cylindrical container. Upon comparing with the thickness of the cylindrical container 12 of about 25 mm, the thickness of the bottom board 14b is much thicker so that radiation from an environment can be shut and a repairing operation can be continued in the reactor vessel 20.

A sealing member such as an O-ring and so on (not shown) is provided between the lower platform 14 and the upper platform 13 so as to keep a water-tight condition.

Similar sealing members is provided at a portion between the upper platform 13 and the adjacent cylindrical container 12 and a portion between the adjacent both cylindrical containers 12, respectively.

Figure 8:
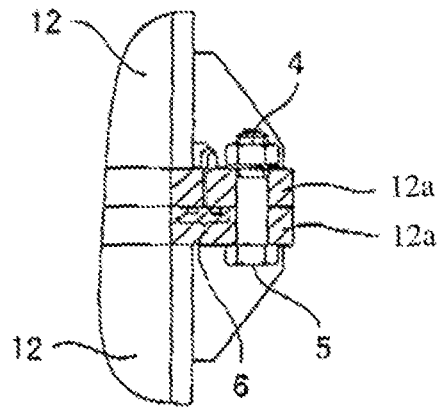
FIG. 8 shows a detailed view of a joint portion of cylindrical containers.

For example, as shown in FIG. 8, in the case that several cylindrical containers 12 are connected in series, a flange portion 12a protruded toward outer peripheral direction at the lower end of one cylindrical container 12 and another flange portion 12a protruded toward outer peripheral direction at the upper end of the next cylindrical container 12 are overlapped each other and fastened by engaging a penetrated bolt 4 and a nut 5. Further, double O-rings 6 are provided at an inner side with respect to an engagement of the bolt 4 and the nut 5.

Thus, even if the frame 10 which is formed by the platforms 13, 14 and several cylindrical containers 12 connected in series is dipped into the cooling water, the cooling water 2 outside of the frame 10 could not be leaked into an interior of the frame 10.

As shown in FIG. 7, the earthquake-resistant support member 11 is attached to the uppermost portion of the frame 10 and several portions of the earthquake-resistant support member 11 are connected with a cavity wall (a structure existing at a peripheral area) 9 by tensile adjustable connecting tools 30, respectively with the same interval. The connecting tools 30 are descried in detail hereinafter.

Figure 10:
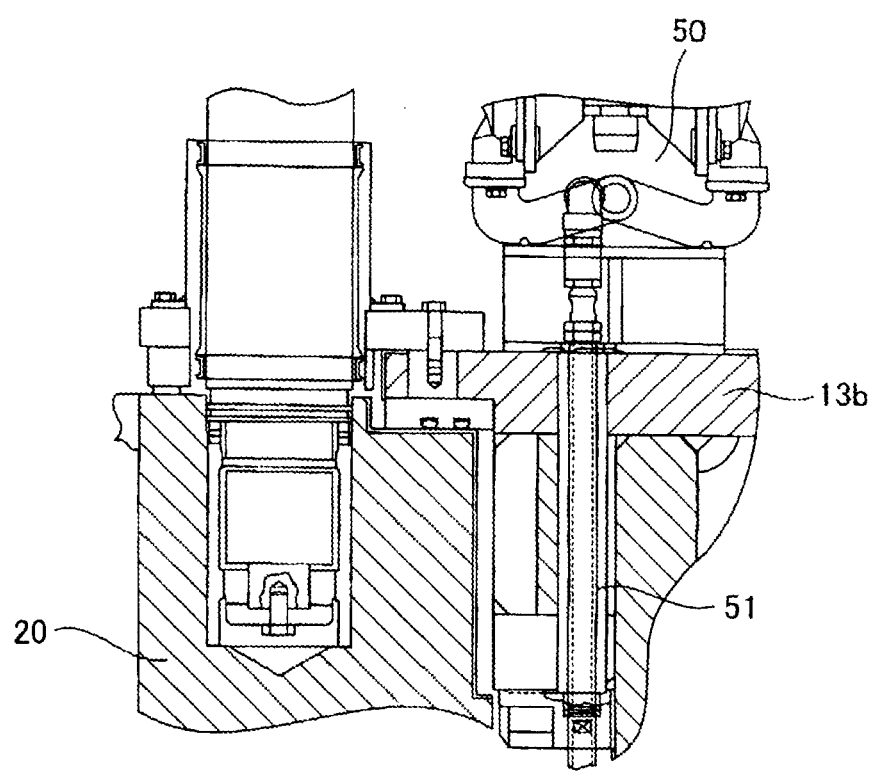
FIG. 10 shows a detailed view of a pump mounted on a platform.

As shown in FIG. 10, a pump 50 is mounted on the flange portion 13b of the upper platform 13 and a pipe 51 is connected to the pump 50 and downwardly extended along a portion between the platform 13 and the reactor vessel 20. Accordingly, the cooling water 2 stored in the rector vessel 20 can be pump up by the pump 50 through the pipe 51 so as to discharge the exterior. Thereby, a water surface level in the reactor vessel 20 can be lowered with respect to the position of the tubular frames 21, 22.

Further, a water gauge sensor (not shown) for detecting a water surface level in the reactor vessel 20 is provided. When the water gauge sensor detects that the water surface level becomes a level previously set, the pump 50 may be automatically switched on so as to drop the water surface level lower than a predetermined water surface level.

If the cylindrical containers, a function element for discharging a cooling water in the reactor vessel and the water gauge function element are designed integrally, the cylindrical containers and the platforms are set at the reactor vessel so that the cooling water can be immediately discharged.

The cooling water located beyond a lower end of an inner diameter of the tubular frames 21, 22 can be discharged by a system previously set.

Figure 11:
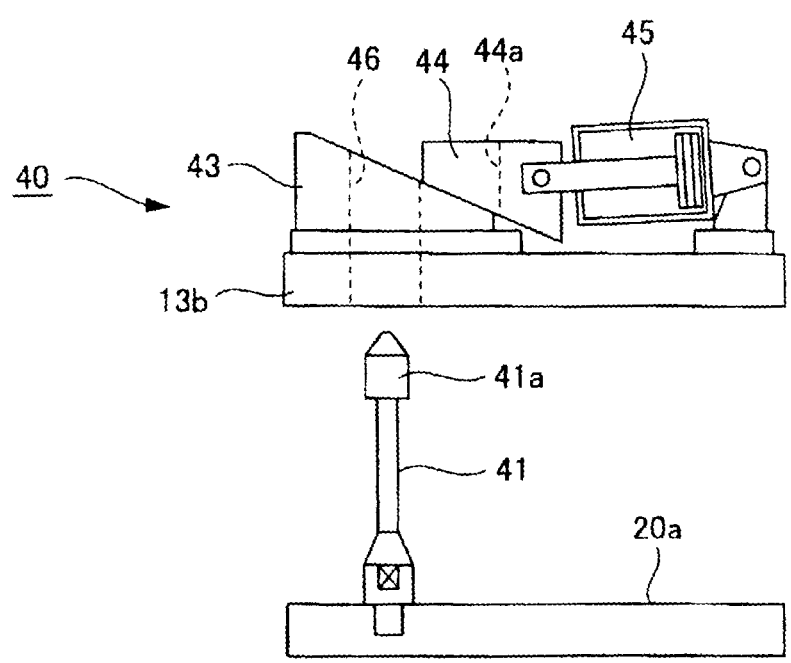
FIG. 11 explains how a taper key and a clamp cylinder are attached.
Figure 12:
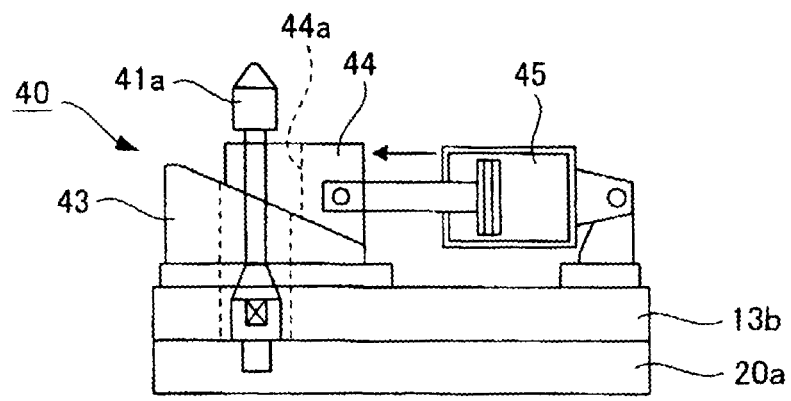
FIG. 12 shows the taper key pushed and inserted.
Figure 13:
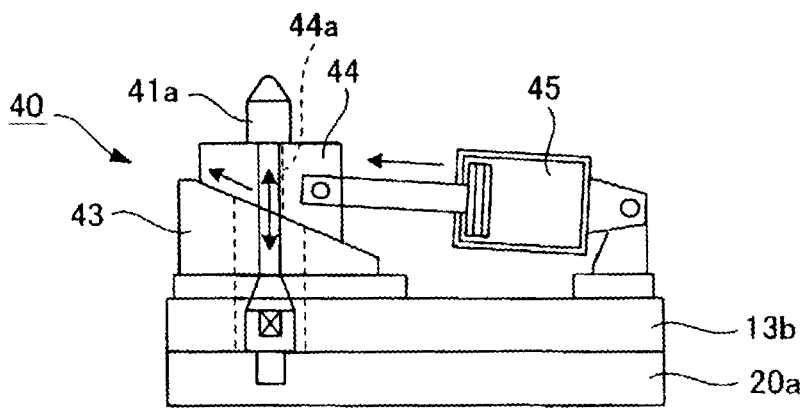
FIG. 13 explains how an axial force is applied to a pin.

With reference to FIG. 11 through FIG. 13, it will be explained how the underwater fastening portion 40 can firmly fasten the flange portion 13b with respect the flange sheet surface 20a of the reactor container 20.

The underwater fastening portion 40 comprises a pin 41 upwardly fixed on and perpendicularly standing with respect to the flange sheet surface 20a of the reactor vessel 20. After releasing the upper cover member from the reactor vessel 20, the pin 41 is fixed at a screw hole (stud bolt hole plug) that is also utilized so as to fix the upper cover member on the reactor vessel 20 with a bolt.

Further, the underwater fastening portion 40 also comprises wedge portion 43 formed on an upper surface of the flange portion 13b, a taper key 44 slidably arranged on a taper surface of the wedge portion 43 and a clamp cylinder 45 of which one end is connected to the taper key 44 and the opposite end is connected to the flange portion 13b.

A big hole 46 is formed by penetrating the both of the flange portion 13b and the wedge portion 43 wherein a diameter of the big hole portion 46 is larger than a head portion 41a of the pin 41. As shown in FIG. 11, in the case that the frame 10 is integrally hung up, the head portion 41a of the pin 41 penetrates the big hole 46. On the other hand, a groove portion 44c is formed at the taper key 44 wherein a width of the groove portion 44c is narrower than a width of the head portion 41a of the pin 41 and wider than a width of a main body of the pin 41.

Accordingly, as shown in FIG. 12, in the case that the taper key 44 is horizontally pushed toward an arrow as shown in FIG. 12 along the flange portion 12b by the (hydraulic) clamp cylinder 45, the pin 41 is inserted into the groove portion 44c in the taper key.

Further, as shown in FIG. 13, in the case that the taper key 44 is horizontally pushed toward an arrow as shown in FIG. 13 along the flange portion 13b by the clamp cylinder 45, the taper key is slit toward an upwardly inclined direction as shown as an arrow in FIG. 13 along a taper surface of the wedge portion 43. Then, an upper surface of the taper key 44 contacts with the head portion 41a of the pin 41 so that tensile force (axial force) is produced in a vertical line at the pin 41 as an arrow as shown in a middle portion in FIG. 13.

As a reaction force, force for downwardly pushing the flange portion 13b with respect to the flange sheet 20a on which the pin 41 is fixed is produced so that the upper platform 13 can be tightly fastened with respect to the flange sheet surface 20a of the reactor vessel 20.

As described above, in a method for fixing the frame 10 at the reactor vessel 20 in the embodiment, although the stud bolt hole plug of the reactor vessel 20 is utilized, it may utilize a bolt and a nut. In addition to a method for fixing the cylindrical container 12 with a bolt and a nut, a clamp and cylinder method can be employed so as to shorten a fixing operation time and to reduce an amount of exposed radiation.

Figure 14:
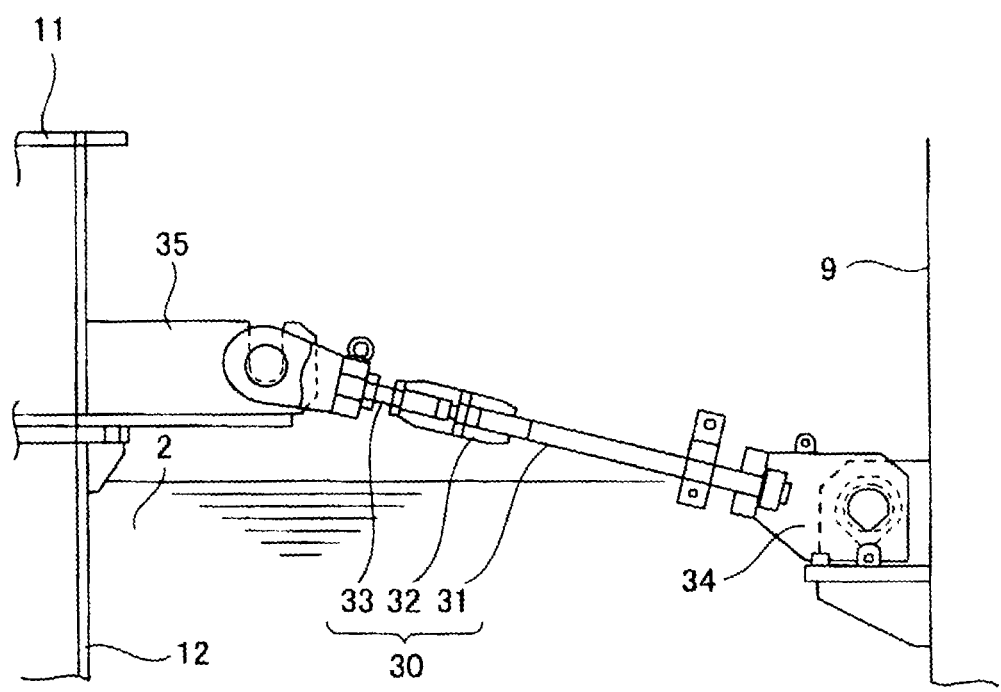
FIG. 14 shows the earthquake-resistant support member and a connecting tool.

With reference to FIG. 14, a connecting tool 30 inserted between the earthquake-resistant supporting member 11 and the cavity wall 9 will be explained.

As shown in FIG. 14, the connecting tool 30 is formed by a body 31 of which the both ends are screw cut in the opposite directions each other, a rod 32 tightened at one end of the body 31 and a rod 33 tightened at another end of the body 31. The rod 32 is fixed at the cavity wall 9 with a pin through a mounting metal tool 34. Another rod 33 is fixed at the earthquake supporting member 11 with a pin through a mounting metal tool 35.

Accordingly, the rod 32 (33) of which one end is screw cut is approaching to/separated from the body 31 by rotating the body 31 so that tensile force produced between the cavity wall 9 and the earthquake-resistant support member 11 can be adjusted through a turn buckle 30.

By affecting a proper amount of the tensile force between the earthquake-resistant support member and the cavity wall, the cylindrical containers can be prevented from swinging and a gap between the adjacent cylindrical containers can be prevented from being occurred even if any vibration such as earthquake are applied. Thus, the cooling water is avoided from being leaked into an interior of the cylindrical containers.

Figure 15:
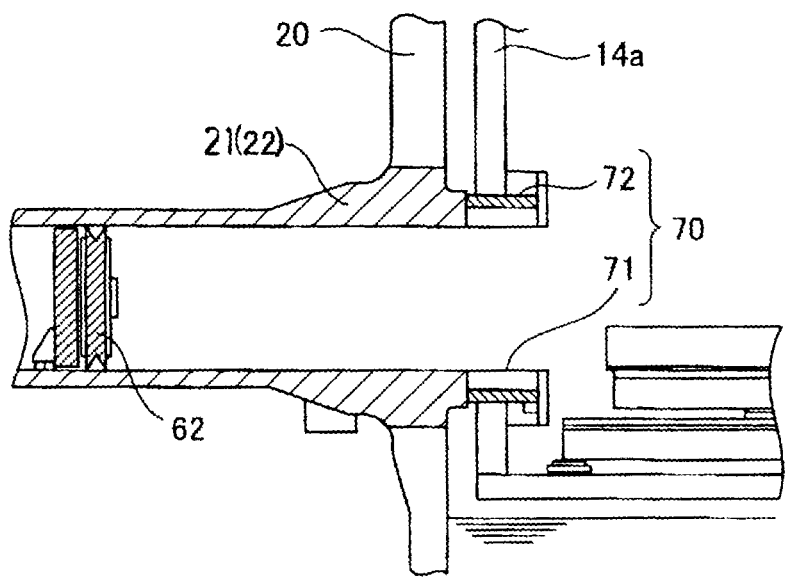
FIG. 15 shows means for shielding a tubular frame and a sealing plug with a shielding performance.

As shown in FIG. 15, a tubular frame shield means 70 are provided so as to shield a gap between an access window 14c of the lower platform 14 and the tubular frames 21, 22.

The tubular frame shield means 70 comprises a cylindrical shield part 71 embedded in a gap between the tubular frames 21, 22 and the access window 14c and a cylindrical nozzle shield member 72 formed at an interior of the cylindrical shield part 71 wherein an inner diameter of the cylindrical nozzle shield member 72 is equal to an inner diameter of the tubular frame 21, 22.

The tubular frame shield means 70 are provided at a portion between the end surface of the tubular frames 21, 22 of the reactor vessel 20 and the lower platform 14 so that foreign matters could be prevented from being dropped in a nuclear reactor. Further, an operator and/or a device can be easily approached to the tubular frames 21, 22.

A reason why the tubular frame shield means 70 have a double shield structure with the cylindrical shield part 71 and the cylindrical nozzle shield member 72 is to provide a thickness so as to protect the interior of the tubular frame against radioactivity sufficiently.

Figure 16:
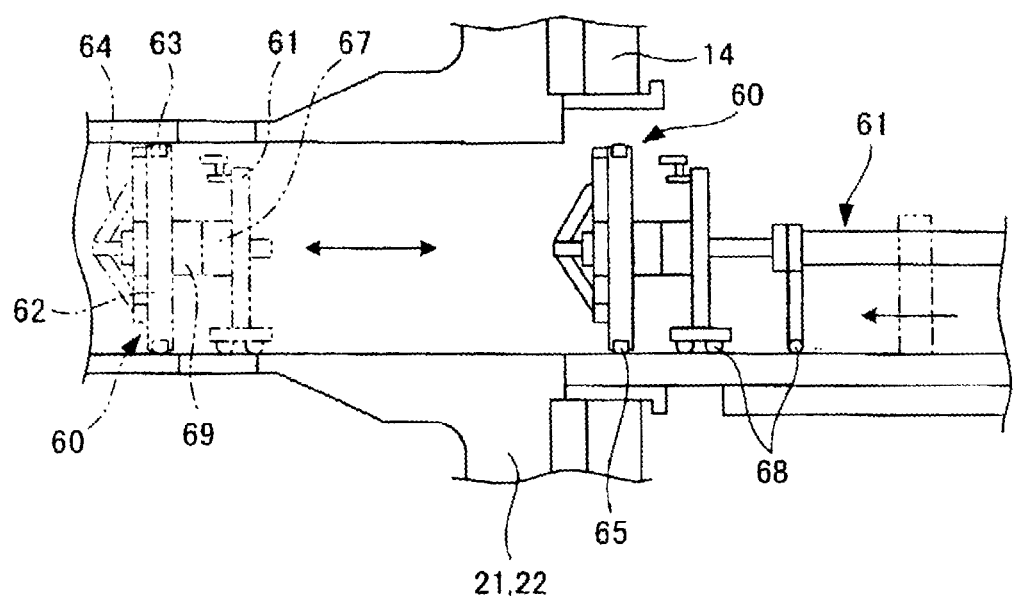
FIG. 16 shows a sealing main body having the sealing plug with the shielding performance and a guiding body.

As shown in FIG. 16, a sealing body 60 having a seal plug for sealing an interior of the tubular frame 21 (22) is provided at the tubular frame 21 (22).

The sealing body 60 comprises a substantially disc-shaped seal plug 62 of which an outer diameter is smaller than an inner diameter of the tubular frame 21 (22), an inflate seal element 63 embedded at an outer peripheral surface of the seal plug 62, fixing jacks 64 radially provided with respect to the seal plug 62 and movable frontwardly/backwardly with respect to an outer peripheral side along a radial direction and a caster 65 for running on an inner surface of the tubular frame 21 (22).

The fixing jacks 64 feed the seal plug 62 toward the outer peripheral portion along a radius direction and contact with the tubular frame 21 (22) located at the outer peripheral portion so that the seal plug 62 can be fixed on an inner surface of the tubular frame 21 (22).

There is a space between an outer peripheral surface of the seal plug 62 and the inflate seal element 63. Thus, the inflate seal element 63 can be swelled toward the outer peripheral side by supplying pressurized air into the space so that a gap between the seal plug 62 provided at the interior of the tubular frame 21 (22) and the inner surface of the tubular frame 21 (22) can be disappeared.

The seal plug 62 is a shield effective seal plug for shielding radioactivity.

A guide member 61 is detachably attached to the seal body 60.

The guide member 61 is a substantially bar-shape and can be inserted into an interior of the tubular frame 21 (22). The guide member 61 comprises a connecting portion 67 provided at a front end and a caster 68 run on the inner surface of the tubular frame 21 (22).

A connected portion 69 corresponding to the connecting portion 67 of the guide member 61 is provided at the seal body 60 so that the connecting portion 67 and the connected portion 69 are detachably engaged each other.

The shield effective seal plug 62 is attached on the interior of the tubular frame 21 (22) of the reactor vessel so that an operator can be access to the interior of the tubular frame 21 (22) and foreign matters are prevented from being inserted into a deep portion of the tubular frame 21 (22).

As described above, in the embodiment, the flange portion 13b of the upper platform 13 is tightly fastened with the flange sheet surface 20a of the reactor vessel 20 by the underwater fastening portion 40 and the earthquake-resistant support member 11 is pulled from the cavity wall 9 toward the circumferential direction with a constant tensile force. Even if the earthquake is happened, building swinging can be effectively controlled or building swinging is quickly absorbed so that the frame 10 is not tilted and water is not leaked into an interior of the fame 10 through joint portions.

In the embodiment, although the platform 13 and the platform 14 are connected so that each platform 13, 14 is individually conveyed, the platform 13 and the platform 14 may be integrally formed.

Likewise, the cylindrical containers 12 are connected in a series, so that each cylindrical container 12 is individually conveyed so as to be conveyed easily. However, the integral cylindrical container may be employed in the present invention.

Further, the platform 13, the platform 14 and the cylindrical containers 12 are connected so that each object can be individually conveyed. If there is no delivery problem, these objects can be formed integrally. Thus, the frame 10 is formed by one integral object.

A method for repairing a reactor vessel in an embodiment according to the present invention is processed in accordance with the following steps:

(1) Forming a frame 10 by connecting the platform 13, the platform 14 and cylindrical containers 12 wherein a sealing member such as an O-ring is inserted into each joint portions therebetween at first and sealing the access window 14c of the lower platform 14 with the cover body 23.

(2) Setting a counter weight 80 in the lower platform 14 in the next, wherein the upper wall as an upper structural body and the reactor core such as an inner structural body are already removed from the reactor vessel 20 and the reactor core is temporally set in the cavity. Water is filled in the cavity and the reactor vessel 20 is covered with the cooling water 2.

(3) Successively, connecting the rod 7 to a suspend hook 11a of the earthquake support member 11 and lifting up the platform 13, the platform 14 and the cylindrical containers 12 as one frame 10, and dropping the frame 10 into the cooling water covering the reactor vessel 20. In the embodiment, a water surface level of the cooling water 2 is unnecessary to be lowered. In the case of the Patent Document 1 as described before, a water surface level has to be previously lowered in the reactor vessel and then a frame is set. That is, its process disclosed in the Patent Document 1 is different from the process of the embodiment according to the present invention.

(4) After setting the platform 13 and the platform 14 as a lower portion of the frame 10 at the reactor vessel 20, tightly fastening the flange portion with respect to the flange sheet surface 20a of the reactor vessel 20 with the underwater fastening portion 40. The underwater fastening portion 40 employs a clamp cylinder method so that the underwater fastening portion 40 can be quickly fastened.

(5) Certainly fixing the frame 10 formed by the platform 13, the platform 14 and the cylindrical containers 12 with respect to the reactor vessel 20 by tightly fastening the flange portion 13b with respect to the flange sheet 20a.

(6) On the other hand, connecting the earthquake support member 11 mounted at the uppermost portion of the frame 10 to four portions of the cavity wall 9 with tensile adjustable connecting tools 30. Thereby, a constant tensile force is applied from the cavity wall 9 to the frame 10 along the circumferential direction so that the frame 10 can be stably set at the reactor vessel 20.

(7) Then, operating the pump 50 so as to discharge the cooling water 2 in the reactor vessel 20 to an exterior of the reactor vessel 20 until a water surface level in the reactor vessel 20 is lower than a location of the tubular frames 21, 22.

(8) In the case that the water surface level in the reactor vessel 20 is lower than the location of the tubular frames 21, 22, removing the cover member 23 from the access window 14c of the lower platform 14, attaching tubular frame shield means 70 for shielding a gap between the access window 14c and the tubular frames 21, 22 and attaching the shield effective seal plug 62 in the tubular frames 21, 22.

(9) After providing air environment in an interior of the tubular frame 21 (22), conveying a decontamination device, a detecting device, a cutting device, a welding device, a furnishing device, and guiding/positioning these devices for repairing operation such as decontaminating, cutting, welding, inspecting, searching and so on.

INDUSTRIAL UTILITY

The present invention is broadly applicable to an industry as a method for repairing a reactor vessel, particularly suitable to a method for repairing an interior of a tubular frame of a reactor vessel of a Pressurized Water Reactor. Further, it is also applicable to a reactor vessel water tight cover device.

EXPLANATION OF NUMERAL 10 frame
11 earthquake-resistant support member 12 cylindrical container
13 upper platform
14 lower platform
20 reactor vessel
21 inlet tubular frame
22 outlet tubular frame
30 connecting tool
40 underwater fastening portion
50 pump
60 seal body
70 pipe shielding means
80 counter weight

The invention claimed is:

1. A method for repairing a reactor vessel covered with cooling water, comprising:
   lowering a tubular frame of which an interior is in an air environment having a bottom board into the cooling water;
   setting a lower portion of said tubular frame in said reactor vessel while said interior of the tubular frame having said bottom board is in said air environment; and
   repairing said reactor vessel,
   wherein a counter weight for canceling out buoyancy occurred in the step for lowering said tubular frame into the cooling water is provided at said frame,
   said frame is formed by a platform set at an interior of said reactor vessel and cylindrical containers connected and laminated on said platform, and
   said platform is formed by a substantially cylindrical shaped sidewall of which an outer diameter is smaller than an inner diameter of said reactor vessel and the bottom board for closing a lower end of said substantially cylindrical shaped sidewall, wherein an access window for connecting a tubular frame provided at a side wall of said reactor vessel is formed at said substantially cylindrical shaped sidewall and said access window can be sealed by attaching a cover body,
   wherein said platform comprises a flange portion protruded from an upper end of said sidewall toward an outer peripheral direction and supported by an upper end of said reactor vessel and a sealing element is inserted to a gap between said upper end of said reactor vessel and said flange portion, and
   wherein a plurality of underwater fastening portions for tightly fastening said flange portion with respect to said upper end of said reactor vessel are provided along a circumferential direction with same interval, wherein each underwater fastening portion comprises:
      a pin upwardly fixed on and perpendicularly standing with respect to the upper end of said reactor vessel,
      a wedge portion formed on an upper surface of the flange portion,
      a taper key slidably arranged on a taper surface of the wedge portion, and
      a clamp cylinder of which one end is connected to the taper key and an opposite end is connected to the flange portion,
   said each underwater fastening portion further comprises:
      a big hole formed by penetrating both of the flange portion and the wedge portion, wherein a diameter of the big hole portion is larger than a head portion of the pin and said head portion of the pin penetrates the big hole, and
      a groove portion formed at the taper key, wherein a width of the groove portion is narrower than a width of the head portion of the pin and wider than a width of a main body of the pin.

2. A method for repairing a reactor vessel as claimed in claim 1 characterized in that a tubular frame shielding means for shielding a gap between said access window and the tubular frame is provided.

3. A method for repairing a reactor vessel as claimed in claim 1 characterized in that a shield effective seal plug for shielding said tubular frame is provided.

4. A method for repairing a reactor vessel as claimed in claim 1 characterized in that an earthquake-resistant support member is attached at an uppermost portion of said cylindrical containers and said earthquake-resistant support member is connected to a structure existing at a peripheral area with connecting tools.

5. A method for repairing a reactor vessel as claimed in claim 1 characterized in that a pump for discharging said cooling water in said reactor vessel to the exterior of said reactor vessel and a pipe connected to said pump are provided at said platform.

* * * * *